2,999,783
PROCESS FOR SIMULTANEOUS PRODUCTION OF HIGH α-PULP WITH FURFURAL FROM LATIFOLIATE TREE MATERIALS

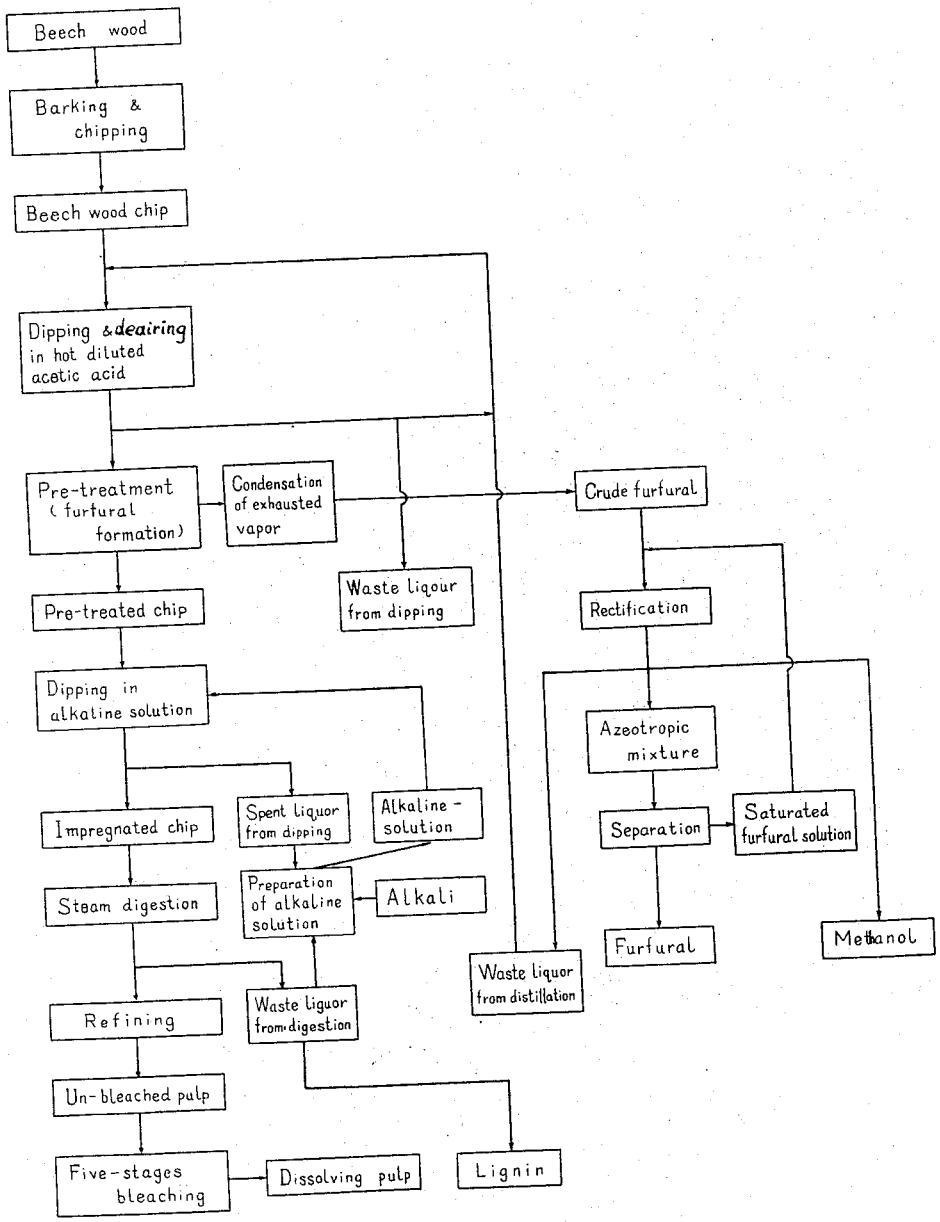
Process flow sheet
INVENTORS.
TOMIO TERAI
TETSUYA TAKAMATSU.

Tomio Terai and Tetsuya Takamatsu, Fukushima-ken, Japan, assignors to Hodogaya Kagaku Kogyo Kabushiki Kaisha
Filed Sept. 29, 1958, Ser. No. 763,830
Claims priority, application Japan Oct. 5, 1957
8 Claims. (Cl. 162—14)

This invention relates to a process for the simultaneous production of low pentosan high α-pulp and furfural from latifoliate tree material.

It is well known that there are many enterprises, wherein furfural is industrially produced simultaneously with various objects of utilizing cellulose residue thereof, such as for wood sugar, hard board, low grade pulp and fuel. However, it has been impossible to obtain such high grade chemical pulp as dissolving pulp because of the following circumstances.

In the production of high α-pulp according to the kraft method, it is known that pentosan may be removed by digesting the raw plant materials with dilute acid or alkali, dilute aqueous solution of salts, or water, thus effecting hydrolysis pre-treatment. However, if the pre-treatment is effected in excess, there is apt to take place hydrolysis of pentosan as wall as of cellulose. Thus, to avoid this, the treatment is effected at a comparatively lower temperature of about 160° C. for a long time of several hours, whereby the hydrolysis products of pentosan in the raw materials are almost left intact in the pentose state and are mainly contained in pre-treatment chips, and their elution into the pre-treatment liquor is very little. In this case, the pentose in the chips may be recovered by washing. However, it is very difficult to recover a high concentration pentose solution with high yield per raw material pentosan. For that matter, according to current practice, the pre-treatment liquor is not used, because it is not an economical raw material for the production of furfural. Also, for the purpose of preventing the lowering of concentration, the cellulose residue is pulverized, triturated or pressed, and filtered, which process results in mechanical damage of the cellulose. Or, by using inorganic acid such as sulphuric acid, hydrochloric acid, raw plant materials are heat treated for comparatively long hours, and furfural of comparatively high concentration is produced by completing hydrolysis and dehydration in one process. By this process, the cellulose is considerably decomposed to be used merely for raw material for decomposition products of cellulose, such as fuel or wood sugar. And, in the known process of acetic acid digesting, the decomposition of cellulose is inevitable, because the production of furfural is completed by treating for long hours at comparatively high temperature, therefore the cellulose cannot be used as raw material for high grade pulp.

On the contrary, the inventors have made researches on the manufacturing conditions which permit the simultaneous manufacture of high grade pulp and furfural, and have accomplished this invention.

The invention is characterized by a combination of several steps. First, wood chips impregnated with diluted organic acids or dipped in water are steamed for a short time under pressure with high temperature steam. The conditions of treatment are controlled so as not to complete all formation of furfural but to leave a part of produced pentose unreacted. Most of the pentosan is at once transferred to furfural without damaging cellulose in the raw materials, then it is separated and recovered. Simultaneously acquired pre-treated chips are successively dipped in alkaline liquor of comparatively high concentration for a very short time at low temperature. The thus impregnated chips are separated from dipping liquor and are then digested by steam for a very short time. In this manner, low pentosan high α-pulp is easily produced.

As is well known, cellulose and pentosan in the wood components are different in their location in the cell-membrane as well as in their reactionability to hydrolysis. In general, the hydrolysis velocity of pentosan is greater than that of cellulose and their difference becomes more remarkable as the temperature becomes higher. By utilizing these properties and with pre-treatment of high temperature and of short time, only the primary membrane in the cellulose cell, which is usually very difficult to be separated and exerts a bad influence upon the reactivity of dissolving pulp, is selectively stimulated. This is accomplished without damaging the secondary membrane and downward, which is utilized as the essential component of dissolving pulp, thus making it easy to remove perfectly the primary membrane in the successive process of alkaline digestion. At the same time, there are removed by this pretreatment the higher polymerized parts (more than about 1700) of cellulose, which exert considerable effect upon non-uniformity of the reactionability of dissolving pulp, therefore upon freeness, turbidity and viscose yield. Furthermore, the separated pentosan component is at once transferred to easily separable and volatile furfural, and so is obtained as a product.

In combination with this pre-treatment, rapid steam digesting is performed by the dipping in low temperature alkaline liquor and by the action of liquor for alkali impregnated chips, which is at comparatively low temperature and possible small amount. Thus the lower polymerized part of cellulose is rectified and separated. And so uniform and easy reactionable high grade dissolving pulp, having optimum distribution of polymerization degree, is found to be produced together with furfural which is obtained in the pre-treatment.

According to this invention, wood chips, which are air-dried, impregnated with diluted organic acids or preliminarily dipped with hot water and deaerated, thus saturately impregnated with water, are digested by blowing superheated steam of 200–260° C. into a reaction vessel under pressure. Thus the pre-treatment for the removal of pentosan is effected, wherein the reaction is controlled by adequate combination of temperature range of 170–215° C. and time range of 0–90 minutes so as to make pentose, which is produced by the hydrolysis of pentosan in raw materials. The remaining unreached pentose is 2.2–6.5% per oven dried raw chip materials. In this case, organic acid is on each occasion newly supplied as acid source. Besides digestion liquor and furfural distillation waste liquor, which are produced in digestion of treated raw material up to the preceding stages containing organic acid, organic acid is preliminarily added to the digester. If desired, dilute furfural acetic acid steam, which is obtained by heating said liquor at 200–260° C., is as saturated steam or as super-heated steam in case of need blown into digester and may be used in circulation. In this case, it is possible to make self-supply of organic acid as well as to raise the recovering ratio of furfural 6–10%.

Thus, most of pentose is dehydrated and furfural is formed, so that if the reaction is stopped, after a certain time, by lowering pressure and temperature due to rapid exhausting from the reactor, and further the distillation of the produced furfural is completed by exhausting or by suction under reduced pressure after slight re-blowing of steam, the furfural is easily obtained with theoretical yield of 35–50%. This is the industrial yield of known practice, giving almost no damage to the cellulose component to be used as the usual pulp component.

The furfural steam, which is obtained in the above mentioned pre-treatment process according to the invention, contains furfural in comparatively high concentration of 6–9% (mean). When it is rectified according to known processes, it is at once easily made to furfural of industrial use and further to rectified furfural, together with by-products of methanol and others.

On the other hand, the chips, which are finished with pretreatment process, are immediately dipped in alkaline liquor of total alkali 100–130 g./l., available alkali 60–90 g./l. and sulfidity 0–30% at about room temperature for 10–30 minutes. Then only the chips which are separated from remaining alkaline liquor are charged to a digester.

The pre-treated chips obtained by the process according to the invention are loose in their chip structures, so that penetration of alkali during liquor dipping is very promptly effected, and further if the distillation of the produced furfural is completed by suction under reduced pressure, the pre-treated chips are put in vacuum conditions, so that the penetration is far more promoted. Excess alkaline liquor, which is separated and recovered after dipping, may be used repeatedly after re-adjusting of its concentration.

The alkali impregnated chips will attain a condition in which their lignin is very easily removed by a special pre-treatment, when they are digested at 160–175° C. by blowing super-heated steam of 200–268° C. In fact the digestion will be accomplished immediately or at the longest in about 10 minutes, because alkaline liquor is uniformly penetrated in the chip structures. Then they are promptly taken out and washed to obtain unbleached pulp. Since most of pentosan in the chips has been removed, there is almost no consumption of alkaline liquor due to pentosan, and since the minimum necessary quantity of alkaline liquor is penetrated in the chips by the control of liquor concentration during dipping, there is no fear of excess digestion and uniform digesting is effected. This prevents excess liquor consumption. For instance, the adsorbed amount of available alkali per oven dried pre-treated chips is 9–12%, wherein more than 90% thereof will be recovered from digestion waste liquor. And, in the steam digestion, the operation of concentration and recovery will be easily effected, because the concentration is comparatively high and the capacity of waste liquid is small.

Thus obtained unbleached pulp is bleached in five stages, then dissolving pulp of rich reactivity and of good quality, having Hunter whiteness 87–92, α-cellulose content 94–96% and pentosan 1.5–2.0%, will be obtained.

By the combination of the pre-treatment process of the invention and successive rapid dipping digesting process, all reactions up to the unbleached pulp production including furfural production will be completed within a short time of three hours. This contributes to the reduction of operation time, therefore to the improvement of rate of operation of the apparatus and to the reduction of capacity of the apparatus. This also improves the yield by restraining decomposition of the produced furfural and remarkably restraining damage to the cellulose. Therefore, it is considered that remarkable progress has been effected on the improvement in the quality of high α-pulp and on the yield of production thereof. And further, the pulp produced by the process of this invention is very much adapted for use as dissolving pulp, since the cellulose primary membrane is moderately stimulated by the special pre-treatment and has become easily reactionable.

In short, the combination of the production of furfural and the production of low pentosan high α-pulp from woods, particularly from latifoliate tree materials, which has been considered almost impossible up to the present, is firstly achieved by this invention and its effect may be said to be immeasurable.

The process according to the invention will be summarized and illustrated in the accompanying drawing.

Some examples for this process will be given as to beech raw material (*Fagus sieboldi max*). However, the invention is by no means limited to this material only. White ash (*Fraxinus americana*), aspen (poplar) (*Populus tremuloides*), cotton wood (*Populus deltoides*), bath wood (*Tilia americana*), paper beech (*Betula papyrifera*), beech (*Fagus astropunicea*), chestnut (*Castanea dentata*), black gum (*Nyssa sylvatica*), oaks (Quercus) and birches (Betula) also may be used as raw materials for this invention.

*Example 1*

In a reactor (digester), 30 parts of beech wood chips (calculated as oven dried chips) is dipped in about 75 parts of hot water of 100° C. for one hour. After being deaired and impregnated with water, high temperature superheated steam of 210° C. is blown in, raising the temperature to 180° C. in about 30 minutes, and maintaining the same temperature for 90 minutes. Then, the steam blowing is stopped, the exhaust valve of the reactor is fully opened to exhaust the produced furfural vapor, and the valve is closed. After the temperature within the reactor has been elevated to 150° C. by again blowing in steam, the steam blowing is stopped, and the exhaust valve is opened to exhaust the remaining furfural together with the steam. When the furfural water solution obtained by condensing all of the exhausted steam is rectified, 1.35 parts of furfural (4.5% per oven dried raw materials) and a small quantity of methanol as by-product is obtained. Unreacted free pentose in this reaction amounts to 1.365 parts (5.5% per oven dried raw materials) in total.

Then, simultaneously obtained pre-treated chip is dipped in 60 parts of alkaline liquor of total alkali 128 g./l., available alkali 81.7 g./l. and sulfidity 0 for 15 minutes at room temperature (23° C.) after separating excess liquor, superheated steam of 210° C. is blown in, raising the temperature to 165° C. in about 20 minutes, and maintaining the same temperature for 10 minutes until the digesting is effected. After digesting, the contents are taken out in a blow tank, and the digestion waste liquor is separated and recovered, then the remaining part is bleached after washing and refining.

The quality of bleached pulp is as follows:

| | |
|---|---|
| Resin ---percent-- | 0.12 |
| Ash ---do---- | 0.06 |
| CaO+MgO ---do---- | 0.012 |
| α-Cellulose ---do---- | 94.8 |
| β-Cellulose ---do---- | 2.4 |
| Pentosan ---do---- | 1.8 |
| Copper number---- | 0.3 |
| Relative viscosity---- | 5.1 |
| Hunter whiteness---- | 90 |

The yield of oven dried pulp is 15 parts (30.5% per oven dried raw materials).

*Example 2*

Under the same conditions and operations as Example 1, 30 parts of beech wood chips (calculated in terms of oven dried chips) is deaerated, impregnated with water and digested in a reactor. Then, the steam blowing is stopped and the exhaust valve of the reactor is fully opened to exhaust the produced furfural vapor. After the pressure within the reactor falls to almost atmospheric pressure, a vacuum pump is set in motion and the remaining furfural in the reactor is evacuated and its pressure reduced to the vacuum of about 200 mm. Hg, then it is exhausted.

When furfural water solution obtained by condensing all of the exhausted steam is rectified, 1.47 parts (4.9% per oven dried raw materials) of furfural and small quantity of methanol as by-product are obtained. Unreacted free pentose in this reaction amounts to 1.34 parts (4.46%, per oven dried raw materials) in total.

Then, simultaneously obtained pre-treated chip is dipped in alkaline liquor (same as Example 1) for 5 minutes at room temperature (25° C.). Then it is digested, washed, refined and bleached under the same conditions and operations as Example 1.

The quality of bleached pulp is as follows:

| | |
|---|---|
| Resin | percent__ 0.12 |
| Ash | do____ 0.05 |
| CaO+MgO | do____ 0.01 |
| α-Cellulose | do____ 95.1 |
| β-Cellulose | do____ 2.0 |
| Pentosan | do____ 2.0 |
| Copper number | 0.3 |
| Relative viscosity | 5.2 |
| Hunter whiteness | 92 |

The yield of oven dried pulp is 9.21 part (30.7% per oven dried raw materials).

*Example 3*

In a reactor, 30 parts of beech wood chips (calculated as oven dried chips) is dipped in 75 parts of diluted water solution of organic acid (calculated as acetic acid) of a concentration of 0.05% by weight and at a temperature of about 100° C. for one hour. After the chips are deaerated and impregnated, high temperature superheated steam of 210° C. is blown in, raising the temperature to 180° C. in about 30 minutes and maintaining the same temperature for 90 minutes. Thereafter, the furfural water solution obtained by same operations as Example 1 is rectified, thus 1.41 parts (4.7% per oven dried raw materials) of furfural and small quantity of methanol as by-product are obtained.

Unreacted free pentose in this reaction amounts to 1.034 parts (3.45% per oven dried raw materials) in total.

Then, simultaneously obtained pre-treated chips are digested, washed, refined and bleached at room temperature (26° C.) under the same conditions and operations as Example 1.

The quality of bleached pulp is as follows:

| | |
|---|---|
| Resin | percent__ 0.11 |
| Ash | do____ 0.06 |
| CaO+MgO | do____ 0.02 |
| α-Cellulose | do____ 94.4 |
| β-Cellulose | do____ 3.4 |
| Pentosan | do____ 1.6 |
| Copper number | 0.3 |
| Relative viscosity | 5.0 |
| Hunter whiteness | 91 |

The yield of oven dried pulp is 9.12 parts (30.4% per oven dried raw materials).

*Example 4*

In a reactor, 30 parts of beech wood chips (calculated as oven dried chips) is deaerated and impregnated with water under the same conditions and operations as Example 1. High temperature superheated steam of 220° C. is blown in, raising the temperature to 190° C. in about 30 minutes, and maintaining the same temperature for 30 minutes. Then the steam blowing is stopped, and exhausting of produced furfural steam and re-exhausting of remaining furfural in the reactor are performed. When the furfural water solution obtained by condensing all of exhausted steam is rectified, 1.425 parts (4.75% per oven dried raw materials) of furfural and a small amount of methanol as by-product are obtained.

Unreacted free pentose in this reaction amounts to 1.074 parts (3.58% per oven dried raw materials) in total.

Then, simultaneously obtained pre-treated chip is dipped in 60 parts of alkaline liquor of total alkali 128 g./l., available alkali 81.7 g./l. and sulfidity 12% for 10 minutes at room temperature (27° C.). After excess liquor is separated, superheated steam of 210° C. is blown in, raising the temperature to 160° C. in about 20 minutes and maintaining the same temperature for 10 minutes until digestion is completed. After digesting, the content is exhausted to blow tank and the digestion waste liquor is separated and recovered, and the remaining part is washed, refined and bleached.

The quality of bleached pulp is as follows.

| | |
|---|---|
| Resin | percent__ 0.13 |
| Ash | do____ 0.06 |
| CaO+MgO | do____ 0.015 |
| α-Cellulose | do____ 95.5 |
| β-Cellulose | do____ 3.5 |
| Pentosan | do____ 1.5 |
| Copper number | 0.3 |
| Relative viscosity | 4.8 |
| Hunter whiteness | 92 |

The yield of oven dried pulp is 8.85 parts (29.5% per oven dried raw materials).

*Example 5*

In a reactor, 30 parts of beech wood chips (calculated as oven dried chips) are, in the same manner as Example 1, impregnated and deaerated in acetic acid water solution of 0.05% by weight. Then high temperature steam of 250–260° C. is blown in, raising the temperature to 205° C. in about 30 minutes and maintaining the same temperature for five minutes to complete the reaction. As soon as the steam blowing is stopped, the exhaust valve is fully opened to exhaust the produced furfural vapor, then the chips are washed by steam at 150° C. for 15 minutes and is also exhausted. When furfural water solution obtained by condensing all of the exhausted steam is rectified, 1.35 parts (4.5% per oven dried raw material) of furfural and a small quantity of methanol as by-product are obtained. In this reaction, a small quantity of water in the reactor bottom and unreacted pentose remaining in the chips after pre-treatment amount to 1.50 parts (5.0% per oven dried raw materials) in total.

Then, the simultaneously obtained pre-treated chips are dipped for 10 minutes in 55 parts of alkaline liquor of total alkali 110 g./l., available alkali 70.5 g./l. and sulfidity 15% at about room temperature, and are separated from un-penetrated liquor, thus only impregnated chips are charged to the reactor, in which steam at 210° C. is blown, raising the temperature to 170° C. in 20 minutes and almost instantaneously digesting the chips at 170–175° C. After digesting, the contents are exhausted in a blow tank and digestion waste liquor is separated and recovered. Then the remaining part is washed, refined and bleached.

As bleached pulp, high grade dissolving pulp of Hunter whiteness 88 containing α-cellulose 94.3%, β-cellulose 3.8% and pentosan 1.05% is obtained with the yield of oven dried pulp 8.85 parts (29.5% per oven dried raw materials).

*Example 6*

The same deaerated and water impregnated chips as Example 1 are placed in a reactor. Separately, the mixed solution (organic acid concentration 2.06%, containing 0.07 parts of furfural and 0.53 parts of pentose), comprising 69 parts of furfural digestion waste liquor containing 1.95% of organic acid (calculated as acetic acid) and 14 parts of reactor bottom liquor pretreated by the preceding operation containing 2.6% of organic acid (calculated as acetic acid), 0.05% of furfural and 3.80% of free pentose (calculated as xylose), is heated to 190° C. to generate steam. This steam is converted into superheated steam of 240° C. by passing through a superheater. Then the superheated steam is directly introduced into the reactor from its bottom, thus raising the temperature of the contents to 195° C. in about 25 minutes and maintaining the same temperature for 17 minutes. The contents are digested for 23 minutes with partial separation of the volatile matter thereof. Thereafter, the treatment is effected as same as Example 1 and all of the exhausted steam condensed liquid of furfural concentration 4.2% and organic acid concentration 1.82% (calculated as acetic acid) is rectified. Thus 2.6 parts (6.0% per oven dried raw material) of furfural and small quantity of methanol as by-product are obtained. And besides, the same pulp as Example 1 is obtained.

*Example 7*

In a reactor, 100 parts of beech wood chips (oven dried chips 42.5 parts) are impregnated with 57.5% water. This is done by hot dipping and deaerating the chips in furfural digesting waste liquor which is first diluted so as to attain an acetic acid concentration of 0.05% by weight. The chips are then directly blown by superheated steam of 210° C. from the bottom portion of reactor, raising the temperature of the contents to 195° C. in about 60 minutes and maintaining the same temperature for about 20 minutes. Then, as soon as the steam blowing is stopped, the exhaust valve on the top of the reactor is fully opened and the produced furfural is exhausted together with steam. These products are led to a receiver through a condenser as furfural water solution. Thereupon a small quantity of low boiling point component such as by-produced methanol is prefectly distilled. When the pressure within the reactor falls to almost atmospheric pressure and the distillation is stopped, the receiver is closed and the reactor is evacuated by a vacuum pump through a condenser so as to reduce the pressure within the reactor. Thus the contents of the reactor are distilled by utilizing latent heat held by the contents and are led to another receiver. After the vacuum attains 200 mm. Hg, the suction is stopped. Since the remaining furfural in wood structure is little and steam is not used for washing, a thick furfural water solution is obtained. The concentration and yield of furfural are 10.3% and 1.5 parts at atmospheric pressure receiver, and 6.85% and 0.65 parts at reduced pressure receiver respectively. The mean values are concentration of 90% and yield of 2.98 parts. This solution is rectified by a known process and a product of furfural 2.1 part (5% per oven dried raw materials) is obtained. By this process, steam consumption per unit weight of furfural is saved about 40% compared with the steam washing process such as Example 1. And besides, the same pulp as Example 1 is also obtained.

Having thus described the invention, what is claimed as new and desired to be secured by Letters Patent is:

1. A process for the simultaneous production of high α-pulp and furfural from latifoliate wood, comprising the steps of saturating a quantity of chips of said wood with liquid by immersing said wood chips in a liquid selected from the group consisting of water and dilute aqueous organic acid at a temperature of 80 to 105° C., draining the excess liquid from said chips, passing superheated steam through said saturated chips so as to heat said chips to a temperature of 170 to 215° C. and to remove furfural from said chips, immersing the residue of the steamed chips in cold alkaline liquor so as to saturate said residue with alkaline liquor, and passing superheated steam through said saturated residue so as to heat the same to a temperature of 160 to 175° C.

2. A process for the simultaneous production of high α-pulp and furfural from latifoliate wood according to claim 1 which comprises performing all of the recited steps in a single vessel.

3. A process for the simultaneous production of high α-pulp and furfural from latifoliate wood according to claim 1 which comprises initially saturating a quantity of chips of said wood with liquid by the following steps; charging air-dry chips of said wood to a digestion zone, introducing hot water at 80 to 105° C. from an accumulation zone into said digestion zone, circulating said hot water through said accumulation zone and through said digestion zone to remove at least part of the air from said chips and to saturate said chips with water, removing the excess water from said digestion zone and returning said removed excess water to said accumulation zone.

4. A process for the simultaneous production of high α-pulp and furfural from latifoliate wood according to claim 1 which comprises initially saturating a quantity of chips of said wood with liquid by the following steps; charging air-dry chips of said wood to a digestion zone, introducing dilute aqueous organic acid at a temperature of 80 to 105° C. from an accumulation zone into said digestion zone, said organic acid containing about 0.05% by weight of acetic acid, circulating said dilute acid through said accumulation zone and through said digestion zone to remove at least part of the air from said chips and to saturate said chips with said dilute acid, removing excess dilute acid from said digestion zone and returning excess dilute acid to said accumulation zone.

5. A process for the simultaneous production of high α-pulp and furfural from latifoliate wood according to claim 1 wherein, after said saturated chips are treated with steam and prior to the treatment of the residue of said steamed chips with alkaline liquor, the residue of said steamed chips is placed under a vacuum of about 20 to 300 mm. of Hg.

6. A process for the simultaneous production of high α-pulp and furfural from latifoliate wood according to claim 1 which comprises immersing the residue of the steamed chips in cold alkaline liquor in a digestion zone, said liquor having a concentration of 80 to 130 grams of total alkali per liter, said residue being immersed in said alkaline liquor at room temperature for a period of about 5 to 15 minutes.

7. A process for the simultaneous production of high α-pulp and furfural from latifoliate woods according to claim 1 wherein the passage of superheated steam through said saturated chips so as to heat said chips to a temperature of 170° to 215° C. is continued so as to maintain said chips at 170° to 215° C. for a period of time up to about 90 minutes.

8. A process for the simultaneous production of high α-pulp and furfural from latifoliate wood, comprising the steps of saturating a quantity of chips of said wood with liquid by immersing said chips in a liquid selected from the group consisting of water and dilute aqueous organic acids at a temperature of 80° to 105° C., draining the excess liquid from said chips, passing superheated steam through said saturated chips so as to heat said chips to a temperature of 170° to 215° C. and to remove furfural from said chips, immersing the residue of the steamed chips in cold alkaline liquor so as to saturate said residue with alkaline liquor, separating said residue from the excess of said alkaline liquor and passing superheated steam through said saturated residue so as to heat the same to a temperature of 160° to 175° C. for approximately 10 minutes.

References Cited in the file of this patent

UNITED STATES PATENTS

| | | |
|---|---|---|
| 1,739,683 | Lucas | Dec. 17, 1929 |
| 1,741,540 | Richter | Dec. 31, 1929 |
| 1,802,575 | Richter | Apr. 28, 1931 |
| 1,919,877 | Brownlee | July 25, 1933 |
| 2,301,314 | Montanna et al. | Nov. 10, 1942 |
| 2,689,250 | Natta | Sept. 14, 1954 |
| 2,862,008 | Skogh et al. | Nov. 25, 1958 |

FOREIGN PATENTS

| | | |
|---|---|---|
| 494,669 | Great Britain | Oct. 25, 1938 |
| 91,722 | Norway | May 19, 1958 |